United States Patent [19]

Schmidt et al.

[11] Patent Number: 5,212,631
[45] Date of Patent: May 18, 1993

[54] PROGRAMMABLE CONTROLLER PROCESSOR MODULE HAVING MULTIPLE PROGRAM INSTRUCTION EXECUTION SECTIONS

[75] Inventors: Otomar S. Schmidt, Richmond Heights; Raymond R. Husted, Mentor; Wayne Van Sickle, South Euclid; Terrence L. Dauterman, Chardon; David R. Rohn, Richmond Heights, all of Ohio

[73] Assignee: Allen-Bradley Company, Inc., Milwaukee, Wis.

[21] Appl. No.: 874,994

[22] Filed: Apr. 24, 1992

Related U.S. Application Data

[63] Continuation of Ser. No. 575,760, Aug. 31, 1990.

[51] Int. Cl.[5] ............................................. G05B 19/05
[52] U.S. Cl. .................... 364/136; 364/921; 364/926; 364/926.93; 364/931.4; 364/222; 364/228; 364/DIG. 1; 364/DIG. 2
[58] Field of Search ............... 364/131–136, 364/200, 900; 395/275

[56] References Cited

U.S. PATENT DOCUMENTS

| 4,266,281 | 5/1981 | Struder et al. | 395/275 |
|---|---|---|---|
| 4,509,140 | 4/1985 | Cheung | 364/900 |
| 4,742,443 | 3/1988 | Rohn et al. | 364/136 |
| 4,763,251 | 8/1988 | Kauffman, Jr. et al. | 364/200 |
| 4,809,169 | 2/1989 | Sfarti et al. | 395/800 |
| 4,837,682 | 6/1989 | Culler | 395/725 |
| 4,858,101 | 8/1989 | Stewart et al. | 364/131 |

OTHER PUBLICATIONS

MC6881 Floating-Point Coprocessor User's Manual, 1985, Motorola Inc., pp. 1–6f.
MC08020, 32-Bit Microprocessor User's Manual, 1984, Motorola Inc., pp. 1–1f.

Primary Examiner—Dale M. Shaw
Assistant Examiner—Lance Leonard Barry
Attorney, Agent, or Firm—Quarles & Brady

[57] ABSTRACT

A programmable controller has a rack that electrically connects a number of I/O modules to a processor module. The processor module includes a external device communication interface section and a general purpose processor section electrically coupled together by a set of common buses. Both of these module sections include a microprocessor and memory connected by an internal set of buses which are isolatable from the set of common buses. The isolation capability permits the different sections to perform their operations simultaneously. A shared system memory and an rack interface are coupled to the common buses for the exchange of data with the I/O modules. A unique ladder logic processor also is connected directly to the common buses. The ladder logic processor includes a hardwired Boolean bit logic processor and a custom microcoded processor to execute instructions of a ladder type control program. Program instructions which are too complex for execution by the ladder logic processor are executed by the general purpose processor section.

6 Claims, 4 Drawing Sheets

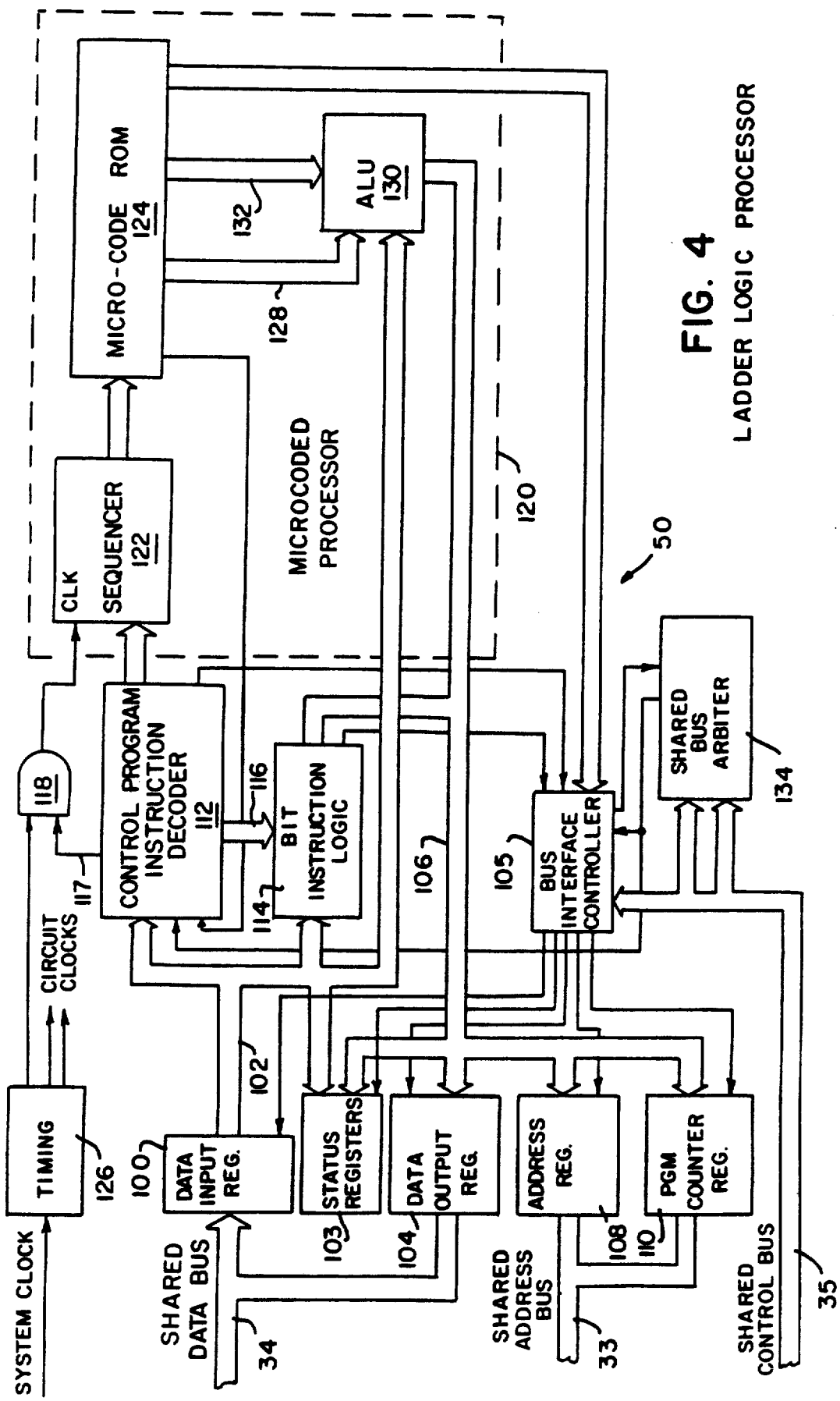
FIG. 4 LADDER LOGIC PROCESSOR

PROGRAMMABLE CONTROLLER PROCESSOR MODULE HAVING MULTIPLE PROGRAM INSTRUCTION EXECUTION SECTIONS

This application is a continuation of application Ser. No. 07/575,760, filed Aug. 31, 1990 now abandoned.

BACKGROUND OF THE INVENTION

The present invention relates to programmable controllers for operating industrial equipment, and more specifically to the processors which execute a user defined control program in such programmable controllers.

DESCRIPTION OF RELATED ART

Programmable controllers are a common type of industrial computer for operating a wide variety of manufacturing equipment, such as assembly lines and machine tools, in accordance with a stored program. The program comprises a series of process control instructions which are read out and executed to examine the condition of selected sensing devices on the controlled equipment, and to energize or deenergize selected operating devices contingent upon the status of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. Additional program instructions perform arithmetic operations, timing and counting functions, and complex statistical reporting operations. Such instructions have become quite standardized in the industry and ar directly associated with the elements of a ladder logic diagram which is easily understood by process control engineers. Program panels such as those described in U.S. Pat. Nos. 3,808,612; 3,813,649 and 4,070,702 have been developed to assist the user in developing and editing ladder logic control programs comprised of such programmable controller instructions.

An elaborate manufacturing process often is broken down into a series of smaller tasks, each defined by a separate ladder logic control program. The overall process is defined by a function chart specifying the order in which these tasks are to be performed and thereby the execution sequence of the corresponding ladder logic control programs. The use of a function chart in a programmable controller is described in U.S. Pat. No. 4,742,443 entitled "Programmable Controller with Function Chart Interpreter."

As programmable controllers were applied to more complex manufacturing systems, multiple controllers were used to govern the operation of different portions of the system. In such applications, it becomes necessary for one programmable controller to exchange data regarding the manufacturing process with the other programmable controllers. Techniques have been developed to communicate data among the programmable controllers as well as with a host computer that supervises the entire manufacturing system. In previous control networks, the host computer provided parameters for the manufacturing process, but could not directly affect the operation of the production equipment. However, it has become desirable to control specific operating devices throughout the manufacturing system from a central location. Thus, programmable controllers are being required to perform more communication functions. Such functions can adversely affect the primary control operation by taking processor time away from the execution of the user control program.

SUMMARY OF THE INVENTION

A programmable controller includes a plurality of input and output modules electrically connected with a processor module which repeatedly executes instructions of a stored control program. The input and output modules interface to sensing and actuating devices on machinery operated by the programmable controller. The processor module executes a user defined control program which examines the status of selected sensing devices and sets the state of the actuating devices in accordance with the examined status based on the logical operations defined by the control program.

The unique processor module comprises a system memory, a ladder logic instruction processor, a communication processor, a general purpose processor and an input/output module interface circuit coupled together by a common set of signal buses. The system memory stores one or more control programs, such as those containing conventional ladder logic instructions. When a plurality of such control programs are stored the memory also contains function chart data defining a sequence in which the programs are executed. Data representing the status of the sensing and actuating devices are stored in the memory, as well as the internal status of the processor.

The communication processor coordinates the exchange of messages with external devices, including other programmable controllers that are coupled to the processor module by a communication link. In the preferred embodiment, this section of the processor module includes a first microprocessor, a first memory means for storing messages and a program for execution by the first microprocessor, a communication link interface, and a first set of isolated buses for electrically connecting the components of the communication processor section together.

The ladder logic instruction processor executes a defined set of instructions that the user can incorporate into the control program for operating the machinery. Preferably, this processor comprises a hardwired logic circuit and a custom microcoded processor for performing two unique subsets of the set of user control program instructions. An instruction decoder may be provided to determine whether the hardwired logic circuit or the custom microcoded processor is to execute a given user control program instruction. When the hardwired logic circuit is to be employed, the decoder configures the circuit to logically evaluate input data in a manner defined by the instruction. When the custom microcoded processor is to be employed, the decoder addresses a microcode routine which evaluates the input data as defined by the decoded instruction. The results of the processing by the ladder logic instruction processor may be stored either in its internal registers or in the system memory.

The general purpose processor interprets the function chart, when one is provided, and executes instructions of the control program which can not be executed by the ladder logic processor. In the described embodiment, the general purpose processor includes a second microprocessor, a second memory means for storing a program which the second microprocessor executes, and a second set of isolated buses for electrically connecting the components of the general purpose processor section together. A mechanism is provided to selectively connect the first and second sets of isolated buses to the common set of signal buses so that the communication processor and general purpose processor are able to access exchange data with other components of the processor module.

An object of the present invention is to provide a processor module for a programmable controller in which external communication functions can be performed without requiring the exchange of data across the backplane of the controller's equipment rack.

Another object is to provide separate sections in the processor module which can simultaneously perform different program execution and communication functions.

A further object of the present invention is to provide a special purpose instruction processor dedicated to executing a set of commonly used ladder logic program instructions to improve the speed at which a user's control program can be performed.

Still another object is to provide a processor which interprets a function chart that defines the sequence in which a number of user programs are executed to carry out the control task. This permits the interpretation of the function chart to proceed while the special purpose instruction processor is executing one of the control programs. As a result when one control program terminates, the interpretation of the next part of the function chart has been completed and the controller knows the next program to execute. This latter processor also executes program instruction which can not be executed by the special purpose instruction processor.

BRIEF DESCRIPTION OF THE DRAWINGS

FIG. 4 is a block diagram of the ladder logic processor in the processor module;

DETAILED DESCRIPTION OF THE INVENTION

Figure 1:
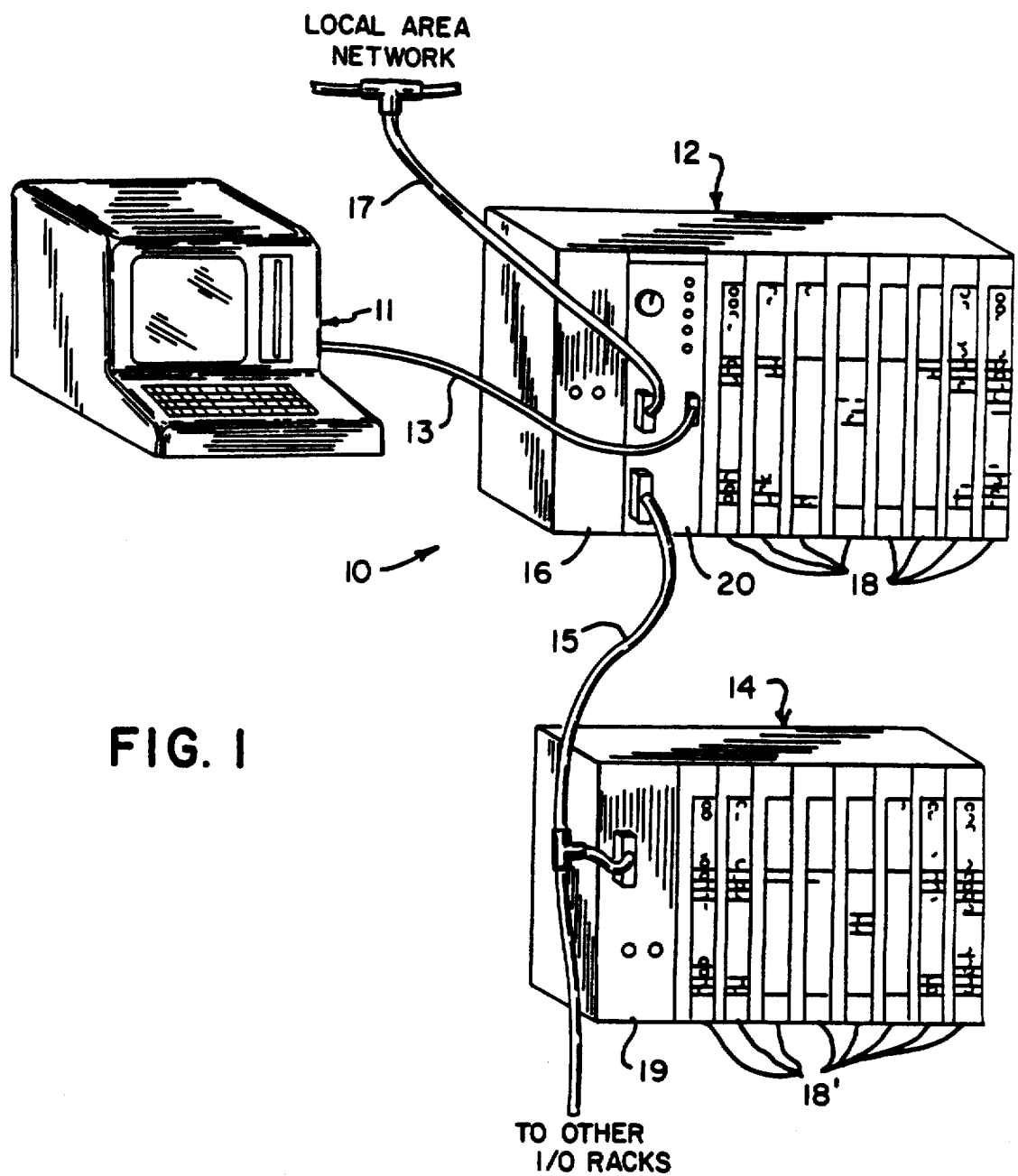
FIG. 1 is a perspective view of a programmable controller system which employs the present invention.

Referring to FIG. 1, a programmable controller system generally designated as 10 comprises a primary equipment rack 12 and a series of remote input/output (I/O) racks, such as rack 14, interconnected by a serial I/O network 15.

The primary rack 12 houses a power supply 16, processor module 20 and a plurality of input/output interface modules 18. The processor module 20 executes a user-defined control program that responds to signals from sensing devices on the controlled equipment by issuing signals to actuating devices on the same equipment. The sensing and actuating signals are coupled to the rack 12 through the input/output interface modules 18. The various modules 18 and 20 within the primary rack 12 are electrically interconnected by conductors on a backplane of the rack enabling data and control signals to be exchanged among the modules.

The processor module 20 receives programming instructions via a terminal 11 that is connected by cable 13 to a serial port connector on the front panel of the module. The I/O network 15 is coupled to another connector on the front panel of the processor module 20 and to an adaptor module 19 in the remote I/O rack 14, enabling the processor module 20 to exchange data with another group of I/O modules 18' within the remote I/O rack. A local area network (LAN) 17 is coupled to a third port connector on the front panel of the processor module 20 enabling the module to communicate with a host computer and other programmable controllers coupled to that network. For example, communication via LAN 17 enables a host computer to direct the operation of a plurality of programmable controllers such as device 10 in order to supervise a complex manufacturing system.

Whereas previous programmable controllers utilized separate modules within the primary rack 12 to perform the program execution, host communication, and remote I/O rack communication functions, the present system incorporates all of these functions within the processor module 20. By doing so, the communication between the modules 18 in rack 12 via the rack backplane has been reduced to exchanging data representing the state of the sensing and actuating devices on the control equipment.

Figure 2:
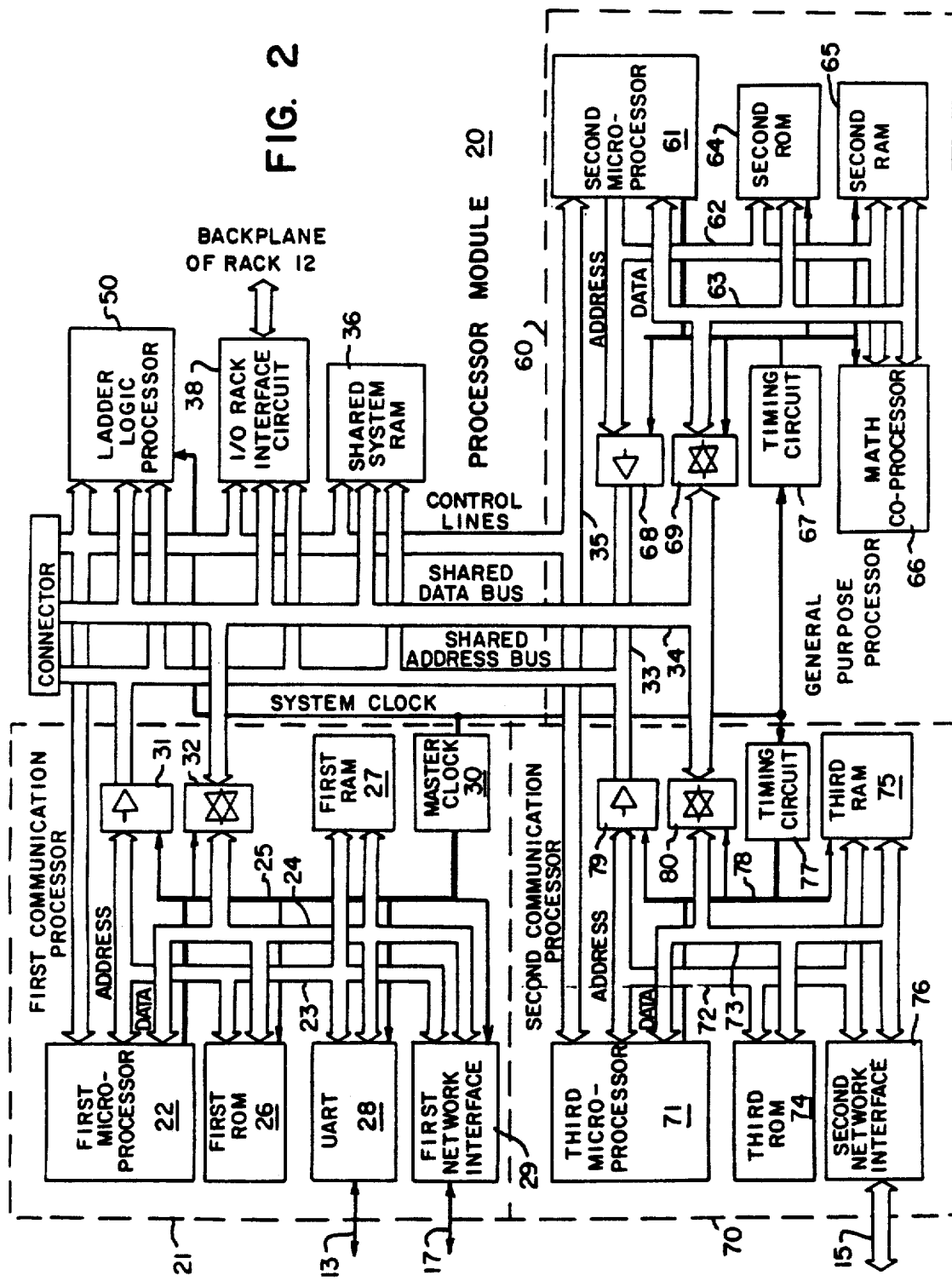
FIG. 2 is a functional block diagram of a processor module which forms part of the controller of FIG. 1.

With reference to FIG. 2, the processor module 20 includes a general purpose processor section 60 for user control program execution and two communication processor sections 21 and 70 to handle the exchange of data over cable 13 and networks 15 and 17. Each of the communication processor sections 21 and 70 can be configured to interface to either a local area network or an I/O network. As will be described in detail, each of these sections of the processor module has its own microprocessor and memory coupled by an isolatable set of address, data and control buses. The processor module 20 also has a set of shared buses which connect these sections 21, 60 and 70 together and to other data processing and storage components.

A first communication processor section 21 is formed around a local address bus 23 and a local data bus 24. Coupled to these buses is a first microprocessor 22 which executes a program stored in a read only memory (ROM) 26 and utilizes a random access memory (RAM) 27 as a scratch-pad for temporary data storage. A master clock circuit 30 provides a system clock signal for other components within the processor module 20 as well as providing specific timing signals via control lines 25 to the components of the first communication processor section 21.

The primary function assigned to the first microprocessor 22 is the control of communication with the programming terminal 11 and the LAN 17. A universal asynchronous receiver/transmitter (UART) 28 couples the local address and data buses 23 and 24 to the terminal via cable 13. The UART 28 is any of several commercially available devices which interface the parallel data format within the processor module to a serial communication format for communicating with the terminal 11. Although the module port from the UART 28 is illustrated as connected to the programming terminal 11, this port can be coupled to many other types of serial devices for the exchange of data with the processor module 20. The local address and data buses 23 and 24 are coupled to a first network interface 29 so that the first microprocessor 22 can transmit and receive data over LAN 17 with other devices coupled to that local area network. The first network interface converts the parallel data within the processor module 20 into a serial formatted message packet which is compatible with the protocol employed to communicate with the devices on LAN 17. Although the first network interface 29 is illustrated coupled to LAN 17, it could be configured for connection to another I/O network. For greater communication capability, the first network interface can have two ports to which networks may be connected.

The first communication processor section 21 is connected to other processor module sections through a set of tri-state address gates 31 and a set of bidirectional tri-state data gates 32. Specifically, the set of gates 31 couples the local address bus 23 to the module's shared address bus 33, and the set of data gates 32 couples the local data bus 24 to a shared data bus 34. A set of control lines 35 extend between processor module components and hereinafter is referred to as a control bus.

Figure 3:
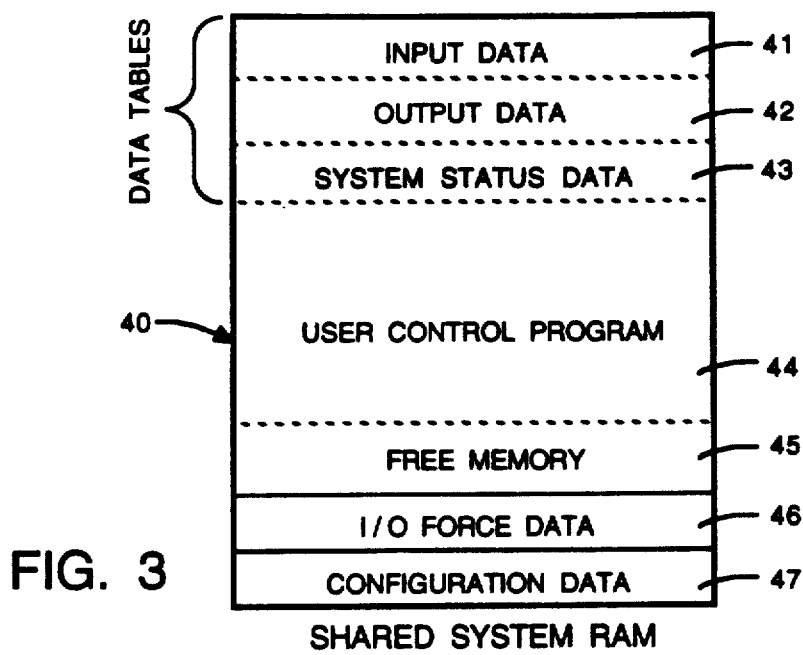
FIG. 3 illustrates the data structures of the shared system memory in the processor module.

This interconnection of buses allows the first microprocessor 22 to write and read data to and from a shared system RAM 36 coupled to the shared address and data buses 33 and 34. The organization of data within the shared system RAM 36 is illustrated in FIG. 3. A block of shared system RAM storage locations contains a conventional set of data tables 41–43 for the processor module 20. The first of these data tables 41 stores input data representing the state of the sensing devices coupled to the controlled equipment. Data from input type I/O modules 18 in the primary and remote racks 12 and 14 are stored in an organized manner in this table 41. A second data table 42 stores output data representing the state of the actuating devices on the equipment which are operated by the programmable controller system 10. Using a similar organization, the output table 42 stores the data employed to control the actuating devices connected to output type I/O modules 18 in racks 12 and 14. Another data table 43 contains information regarding the status of the programmable controller 20 and its components. As may be necessary, additional data tables can be stored in the shared system RAM 36.

A section of the storage locations 44 in the shared system RAM 36 stores the user-defined control program. Depending upon the specific definition of this program given by the user, this block 44 may store a single ladder logic control program or a series of such programs to be executed in a sequence defined by a conventional function chart. In the latter case, the function chart data files also are stored in memory block 44 along with the ladder logic control programs. Following the storage locations used by the control program is a section of free memory locations 45. Another section of the shared system RAM is an I/O force data table 46, similar to that used in previous programmable controllers to force the control data from specific sensing or actuating devices to a given logic state. A final memory section 47 at the high addresses of the shared system RAM 36 is used to contain system, processor module, and microprocessor level configuration data. For example, the configuration data defines number, location and type of each I/O module 18 in racks 12 and 14, as well as I/O port parameters and protocol data. The organization of the sections of RAM 36 is not critical and may vary from that depicted in FIG. 3.

Referring again to FIG. 2, an I/O rack interface circuit 38 is connected to the shared address and data buses 33 and 34 and the backplane of primary rack 12. This interface circuit periodically scans the I/O modules 18 in the primary rack to gather input data from the sensors and send output data to the actuating devices. The scanning is accomplished in a manner similar to that employed by previous processor modules by sequentially sending control signals to each I/O module. These control signals cause input type modules to send sensor data over the backplane and cause output type modules to store data sent by the processor module. The data exchanged with the I/O modules 18 in the primary rack 12 are stored in the I/O data tables 41 and 42 of the shared system RAM 36.

A ladder logic processor 50 is also coupled to the shared address and data buses 33 and 34. The vast majority of ladder control program instructions operate on a single bit or word (i.e. 16 bits) of data. The ladder logic processor 50 has been designed to execute the subset of ladder diagram instructions which perform these basic control operations. This not only provides efficient execution of these instructions, it also frees the microprocessors in the module 20 to carry out other functions simultaneously with the control program execution.

The details of the ladder logic processor 50 are shown in FIG. 4 and preferably are incorporated in a custom integrated circuit. The shared data bus 34 is coupled by a set of input data registers 100 to a internal data bus 102 and by a set of output data registers 104 to an internal multi-purpose bus 106. Both the internal data bus 102 and the multi-purpose bus 106 are connected to a set of status registers 103 for the storage of intermediate processing results as will be described. The multi-purpose bus 106 also is connected to the inputs of a set of address registers 108 and a program counter register 110, both of which have outputs connected to the shared address bus 33. The registers 100, 103, 104, 108 and 110 are tri-state output devices which are enabled at the appropriate times by individual control signals from a bus interface controller 105. These enabling control signals are produced by the bus interface controller 105 in response to request signals from components of the ladder logic processor 50 when such components need to send or obtain information over the shared data bus 34.

When the ladder logic processor 50 needs to obtain data from the shared system RAM 36, the address of the associated storage location holding the data is placed into the address register 108. Similarly when the ladder logic processor 50 needs another user control program instruction to execute, the program counter 110 is updated with the address in the system RAM 36 for that instruction. Then the appropriate register 108 or 110 is enabled to send the address over the shared address bus 33.

The data or user program instructions received via the shared data bus 34 in response to that address transmission are stored in the input data registers 100. Correspondingly, the results of operations performed by the ladder logic processor are stored in the data output registers 104 for transmission over the shared data bus 34.

An instruction decoder 112 processes user control program instructions received from the shared system RAM 36 stored in the data input registers 100. The instruction decoder 112 determines whether a given user program instruction is a bit-oriented instruction, and if so, enables a bit instruction logic circuit 114. The bit instruction logic circuit 114 consists of a hardwired set of gates, which when configured by a set of signals via control lines 116 from the instruction decoder 112, analyze a specific data bit applied from the shared data bus 34 according to the logical operation defined by that instruction. For example, if the instruction is to test whether a sensor switch is closed, the logic circuit examines the bit in the byte of data from input registers 110 which indicates the switch status. If that bit is a high logic level, the output of the bit instruction logic circuit will indicate that the test was true. In response to the analysis, the bit instruction logic circuit 114 sends its output over the multi-purpose bus 106 for storage in the status registers 104.

A rung of a ladder logic control program can include a series of sensor examination instructions followed by one or more output instructions. As each sensor examination instruction is executed, the result is stored in a status register 103 to indicate whether the rung is logically true or false. At the end of the rung, when an output instruction is executed, the truth of the rung from the status register 103 is used to determine the output state, typically whether an actuating device should be turned on or off. For the output instruction, the bit instruction logic 114 determines the appropriate output state which then is stored in the data output registers 104. The address in the output data table 42 in the shared system RAM 36 which stores the state control data for the designated actuating device is loaded into address registers 108 by the bit instruction logic 114. Thereafter, the ladder logic processor requests access to the shared buses 33-35 and stores the result of the rung in the output data table 42. This processing will be described in greater detail subsequently.

If the user control program instruction is not a single bit operation instruction, for example a data word comparison instruction, the instruction decoder 112 activates a custom microcoded processor 120 to execute the instruction. In doing so, the instruction and control codes are sent by the decoder 112 to a sequencer 122. The sequencer 122 contains a look-up table ROM which converts the opcode of the control program instruction to the initial address within a microcode ROM 124 which contains a set of microcode instructions defining the operation to be performed in response to that instruction. For example, the microcode ROM 124 may have 4K storage locations, each of which is capable of storing a 56 bit microcode instruction.

The instruction decoder 112 at this time also provides a high level signal over line 117 to one input of an AND gate 118. The system clock signal from master clock circuit 30 in FIG. 2 is applied to a timing circuit 126 which derives a set of clocks signals for the ladder logic processor 50 from the system clock signal. The derived clock signal for the custom microcoded processor 120 is coupled to the other input of the AND gate 118. The AND gate input from the instruction decoder 112 gates the clock signal to the custom microcoded processor 120 when the latter device is to process the user control program instruction. The output of the AND gate clocks the sequencer 122 to sequentially address each instruction within the microcode ROM 124 in order to perform the defined operation.

The microcode instruction stored at the location addressed by the sequencer 122 then is sent out to other components within the ladder logic processor 50. As in previous bit slice processors, different groups of microcode instruction bits define control signals for such components. Several of these bits are used to activate different components within the processor. For example, one group of instruction bits are sent over lines 132 to configure an arithmetic logic unit (ALU) 130, to perform the instructed operation. Another group of microcode instruction bits inform the bus interface controller 105 that a read or write operation via the shared buses 33-35 is to be performed.

The microcode instruction may also contain data, which is sent to the ALU over lines 128. The ALU also receives data through a connection to the internal data bus 102, typically from the data input registers 100. As with conventional arithmetic logic units, ALU 130 includes an internal set of registers for holding operands, counter values and results of the processing. The results of the arithmetic operation are applied by the ALU to the multi-purpose bus 106 for storage in the appropriate set of registers 103, 104, 108 or 110.

The ladder logic processor 50 also arbitrates among competing requests from processor module components for access to the shared buses 33-35 and grants such access based upon a predefined priority. To perform this function a shared bus arbiter 134 is provided which receives bus access requests from the three microprocessors 22, 61, and 71 over lines of the shared control bus 35. Similarly, when the ladder logic processor 50 requires access to the shared buses, the bus interface controller 105 issues a request to the shared bus arbiter 134. In response to the bus access requests, the shared bus arbiter 134 sends a bus access grant signal to the requesting device which is to have access to the buses. Under ordinary circumstances, once the ladder logic processor 50 has been granted access to the shared buses 33-35, it retains such access until one of the three microprocessors 22, 61, or 71 requests bus access, even though the ladder logic processor may not be utilizing the buses at a particular instant. This is contrary to the operation with respect to the use of the shared buses 33-35 by the microprocessors within the processor module 20. When a microprocessor 22, 61, or 71 no longer requires access to the shared buses 33-35, the access is relinquished so that the next time it requires the use of the buses, it must once again request and receive access from the shared bus arbiter 134. Whereas once the ladder logic processor 50 has received the access, it can repeatedly use the shared buses unless one of the microprocessors has been granted access to the shared buses during a period in which the ladder logic processor was not actually utilizing those buses. This speeds the program execution by the ladder processor since the device does not have to repeatedly request access to the shared buses and wait for the arbitration process time when none of the microprocessors requires that use. Since the majority of the ladder control program instructions are executed by processor 50, this bus access technique speeds program execution.

Referring once again to FIG. 2, certain functions, such as immediate I/O module access, data block transfers to the I/O modules 18, and complex mathematical and logical operations cannot be performed by the ladder logic processor 50. These complex control program functions are executed by the general purpose processor section 60. This section 60 of the processor module 10 contains a second microprocessor 61 connected to its own isolated set of address and data buses 62 and 63, respectively. This pair of buses 62 and 63 couples the second microprocessor 61 to a second ROM 64 and a second scratch-pad random access memory 65. The ROM 64 stores the firmware which is executed by the second microprocessor 61 to carry out the complex ladder logic operations. The firmware in ROM 64 also interprets the function chart when one is defined by the user.

Many of the user control program instructions which the ladder logic processor 50 cannot perform are complex arithmetic operations. Therefore, a conventional math co-processor 66 is provided to execute the corresponding instructions more efficiently than by using the second microprocessor 61. A timing circuit 67 receives the system clock signal and derives therefrom the necessary timing and control signals for the second microprocessor 61, memories 64 and 65, and the math co-processor 66. A pair of tri-state transmission gates 68 and 69 isolate address and data buses 62 and 63, respectively of the general purpose processor section 60 from the shared address and data buses 33 and 34. When these gates 68 and 69 are enabled in response to a command from the second microprocessor 61, the internal set of buses 62 and 63 are electrically connected to shared buses 33 and 34. This enabling occurs only when the second microprocessor 61 requires access to the shared system memory and has been granted access to buses 33 and 34 by arbiter 134.

In addition to performing the complex ladder logic operations, the second microprocessor 61 and its associated circuits also interpret the function chart which defines the sequence in which a number of ladder logic programs are executed. Because the second microprocessor and its memories have a separate set of buses 62 and 63 interconnecting them which can be isolated from the shared buses 33 and 34 used by the ladder logic processor 50, the second microprocessor 61 can begin processing the next step of the sequential function chart while the ladder logic processor 50 is executing the ladder logic program of the current function chart step. This enables the processing module to make a rapid transition from one function chart step to the next without having to interpret the function chart after the end of the ladder logic program for the previous step.

As described above, the processor module 20 is coupled via I/O network 15 to one or more remote I/O racks 14. The processor module utilizes a second communication processor section 70 with a third microprocessor 71 to control the gathering of sensor data and the transmission of actuating device state commands to these remote racks. The third microprocessor 71 is coupled to another set of isolated address and data buses 72 and 73 and a set of control lines 78. A ROM 74 is connected to these buses and stores the firmware which is executed by the third microprocessor 71 to perform its communication function. A RAM 75 provides a scratch-pad memory and temporary storage location for the data being communicated over cable 15.

A second network interface 76 translates the parallel data format within the processor module into the serial format and the specific protocol used to communicate the data over the I/O network 15. The second network interface 76 alternatively can be configured for connection to a second LAN and for greater communication capability can have a second port. A timing circuit 77 receives the system clock signal from the master clock circuit 30 to provide the necessary timing signals for the components associated with the third microprocessor 71. These timing signals are transmitted via some of the control lines in set 78.

The address bus 72 coupled to the third microprocessor 71 is connected to the shared address bus 33 by a set of tri-state gates 79. Similarly, the data bus 73 associated with the third microprocessor 71 is coupled to the shared data bus 34 by a set of tri-state, bidirectional gates 80. Both sets of gates 71 and 80 are enabled by signals via control lines 78 from the third microprocessor 71. The gates are enabled when the third microprocessor 71 has been granted access to the shared buses 33 and 34 by the shared bus arbiter 134 within the ladder logic processor 50.

When the processor module 20 is configured for the communication connections shown in FIG. 1, the third microprocessor 71 exchanges I/O data with the remote rack 14. In doing so, the microprocessor 71 periodically accesses the shared system RAM 36 to obtain data from the output data table 42 depicted in FIG. 3 which represents the status of output devices connected to the remote I/O racks 14. This data is temporarily stored within RAM 75 shown in FIG. 2. The third microprocessor then breaks up the data into blocks for each remote rack 14, if there is more than one, and sequentially formulates the network message packets to transfer the blocks of data over the I/O network 15 to the appropriate remote rack 14.

In a similar manner, the third microprocessor 71 sequentially sends a command through the second network interface 76 to each of the remote racks 14 instructing them to transfer the input data from the sensing devices coupled thereto to the processor module 20. As the sensing device data is being received, the third microprocessor 71 transfers it from the second network interface 76 to a temporary storage section within RAM 75. Once the input data from all of the remote racks 14 has been stored within RAM 75, the third microprocessor requests access to the shared data and address buses 33 and 34 so that the input data may be transferred to the shared system RAM 36 where it is stored within the input data table 41. The structure of the processor module 20 allows the user to dedicate the third microprocessor 71 to scanning the remote racks 14 by which sensor data is gathered from and actuator data is sent to those racks. This provides a high speed mechanism by which the status of the devices connected to the remote racks is continuously being updated.

With reference to FIG. 1, the user writes the control program on terminal 11. The terminal is actually a personal computer which executes a program allowing the user to graphically construct ladder logic control programs and sequential function charts on the terminal. The programming software within terminal 11 reduces the graphical representation of the ladder diagram control program into a data file containing a sequence of control program opcodes and operands in a sequence determined by the ladder control diagram as described in U.S. Pat. No. 4,858,101. Similarly, the control program authoring software in terminal 11 breaks the function chart down into a series of descriptors which are stored in a data file. Thereafter, the function chart descriptor and ladder logic control program files are transferred from the terminal 11 into the processor module 20.

With reference to FIG. 2, the transferred function chart and ladder logic control program files are received over cable 13 by the UART 28 and stored by the first microprocessor 22 in locations within the first RAM 27. Alternatively, these files could be downloaded from a host computer over LAN 17 and through the first network interface 29. After a defined section of the program file has been stored in first RAM 27 (i.e. after each ladder diagram rung), the first microprocessor 22 requests access to the set of shared address and data buses 33 and 34 by issuing a request on one of control lines 35 coupled to the arbiter circuit 134 within the ladder logic processor 50. When access to the shared address and data buses has been granted, the first microprocessor 22 transfers the program file from the first RAM 27 into section 44 of the shared system RAM 36 which is designated to store the user control program. Once all of the user control program files have been stored within the shared system RAM 36, the programmable controller 10 may be instructed to begin executing the control program by either issuing the proper command through one of the ports on the processor module 20 or by turning a key switch on the front panel of the module.

As with previous programmable controllers, the present one may be programmed to execute either a single ladder diagram control program or interpret a sequential function chart which contains a number of steps, each specifying the execution of a different ladder diagram program stored within the shared system RAM 36. If the user has defined a sequential function chart, the second microprocessor 61 executes a function chart interpreter program stored as firmware within the second ROM 64. This interpretation of the function chart descriptor data is similar to that performed by previous programmable controllers. However, in order to obtain the function chart descriptor data from the shared system RAM 36, the second microprocessor 61 must gain access to the shared address and data buses 33 and 34. When the programmable controller is first placed into the run mode, the second microprocessor 61 may make duplicate copies of the function chart descriptor files in its own RAM 65 to reduce the need to gain access to the shared address and data buses 33 and 34 and expedite the interpretation process.

When a new function chart step descriptor is interpreted, the second microprocessor 61 can obtain the starting address of a ladder control program contained within the descriptor data for that step. This starting address identifies the storage location of the shared system RAM 36 where the first instruction of the ladder control program is stored. The starting address is transferred by the second microprocessor to the ladder logic processor 50 where it is stored in the program counter register 110.

On the next cycle of the system clock, the sequencer 122 addresses an instruction in microcode ROM 124 for fetching that first ladder control program instruction. Specifically, that microcode instruction configures the bus interface controller 105 to request access to the shared buses 33 and 34. When that access is granted by the shared bus arbiter 134, the bus interface controller enables the program counter register 110 to send the address of the first instruction over the shared address bus 33 to the shared RAM 36 along with control signals on bus 35. The shared system RAM 36 responds by sending the first instruction of the ladder control program onto the shared data bus 34. This instruction is stored in the data input register 100 which has been enabled by the bus interface controller 105. Thereafter, the control program instruction decoder 112 receives the instruction from the data input register 100.

The stored instruction is then fed over the internal data bus 102 to the control program instruction decoder 112. The primary function of the control program instruction decoder 112 is to determine whether the instruction is to be handled by the bit instruction logic 114 or by the custom microcoded processor 120 and configure the selected device accordingly. The initial determination is made by inspecting the opcode portion of the ladder control program instruction.

Assuming that the instruction is to be handled by the bit instruction logic 114, the control program instruction decoder uses the opcode to configure the logic 114 for the specific instruction. For example, the ladder program instruction may call for a particular bit in the input data table 41 to be examined. In this case, the examination operation (e.g. examine for true or examine for false) designated by the opcode of the ladder program instruction is used to apply control signals via lines 116 to configure the hardware gates in the bit instruction logic. In addition since input data is stored in word size groups, the opcode also identifies which bit of the word is to be examined. This part of the opcode also is used to generate control signals to configure the bit instruction logic to examine the designated bit.

Once the bit instruction logic 114 has been configured and enabled, the operand address contained in the ladder program instruction is used to obtain the data from the input data table 41 in the shared system RAM. From the operand address, which may be merely an index from the beginning of the input data table, the bit instruction logic 114 produces the shared system RAM address containing the input data to be examined. This address is stored in a set of address registers 108 from which it is sent over the shared address bus 33.

The word of input data is returned over the shared data bus 34 and is stored in the data input registers 100. This word then is fed over the internal input data bus 102 to the bit instruction logic 114. The bit instruction logic 114 is similar to other "Boolean" logic circuits used in previous programmable controllers which determine whether the logical examination of the designated bit yields a true or false result. The result of the bit examination are transmitted via the multi-purpose bus 106 for storage in one of the status registers 103 which indicates the truth of the ladder rung. At the completion of all the input data examination instructions for the rung, this status register 103 indicates whether the entire rung is true or false according to Boolean logic.

The rung terminates with one or more output instructions the execution of which responds to the truth of the rung as stored in a status register 103. In executing a bit type output instruction, the bit instruction logic 114 examines the rung truth and, if necessary, alters a bit in an output data word. This bit corresponds to the state of the output device specified by the opcode of the output instruction. The operand of the instruction is used to form the address in the output data table 42 in which the output word is to be stored. This address is loaded into address register 108. The bit instruction logic then requests access to the shared buses 33-35. When the ladder logic processor 50 has that access, the output word is stored in the shared system RAM 36.

Because of the speed achieved with hardwired logic, the examination by the bit instruction logic occurs within one cycle of the system clock. Therefore, upon the next system clock cycle, another user control program instruction can be fetched from the shared system RAM 36. It should be noted that while the user control program instructions are being executed by the bit instruction logic, a low logic level signal is being applied by the instruction decoder 112 via line 117 to one input of AND gate 118. This low level signal blocks the clock signal produced by timing circuit 126 from reaching the sequencer 122. As a result, the sequencer does not increment the address that it applies to the microcode ROM 124 which remains held at a microcode instruction that increments the program counter register 110 and fetches the next ladder program instruction. Therefore, as long as the bit instruction logic 114 continues to process the user program instruction, the custom microcoded processor repetitively fetches new instructions on every cycle of the system clock.

Alternatively, the control program instruction decoder 112, upon inspecting the opcode of a control program instruction stored in the data input register, may find that the instruction is of a type that is executed by the custom microcoded processor 120. In this case, the decoder 112 uses the opcode portion of the instruction to address a look-up table to find the address of the first instruction of the microcode routine which performs the instructed operation. This address is sent to sequencer 122 simultaneously with a high level applied over line 117 to AND gate 118. When the sequencer 122 is clocked by the output of the timing circuit 126 passed by the AND gate 118, the address from decoder 112 is sent to the microcode ROM 124.

This address causes the microcode ROM 124 to output the first microcode instruction of the routine that performs the instructed operation. The routine comprises a sequence of micro-code instructions which, depending upon the particular operation designated by the ladder logic control program instruction, obtains data from the shared system RAM 36 and carries out the defined arithmetic or logic operation on the data. The access to the shared RAM 36 is much the same as that performed by the bit instruction logic 114 previously described, except the ALU 130 forms the RAM address from the operand of the ladder logic control program instruction. The RAM address then is stored in the address register 108 as was done by the bit instruction logic. The results of the execution by the custom microcoded processor are stored in either the status registers 103 or in the shared system RAM 36.

Upon each cycle of the output signal from the timing circuit 126 applied to the clock input of the sequencer 122, the address for the microcode ROM 124 is incremented by the sequencer. This steps the microcode ROM 124 through the microcode instructions of the routine that performs the instructed operation.

As noted above, the ladder logic control program instructions have evolved to include relatively complex operations and even calling machine language programs for statistically evaluating the controlled manufacturing process. Such non-traditional ladder logic functions are beyond the performance capability of the ladder logic processor 50. Such instructions are recognized as such by the control program instruction decoder 112. In response, the ladder logic processor 50 sends an interrupt signal to the second microprocessor 61 in the general purpose processor section 60. This interrupts any processing which this section 60 is performing placing that processing on hold. By sending the interrupt signal on a specific line of the shared control bus 35, the second microprocessor 61 is informed that it is to execute an instruction of the user defined ladder logic control program which takes priority over other processing tasks assigned to that microprocessor. The address of the ladder logic control program instruction is transferred from the program counter register 110 of the ladder logic processor into a register of the second microprocessor 61. This microprocessor then obtains the instruction from the shared system RAM 36 and begins executing a routine stored in the second ROM 64 which interprets the instruction. In doing so, the second microprocessor 61 may be assisted by the math coprocessor 66 in a well-known manner. At the completion of the user control program instruction, the second microprocessor signals the ladder logic processor over a line of control bus 35 that the latter device should resume its execution of the user control program.

Thereafter, the general purpose processor section 60 resumes the processing task which was interrupted in order to execute the ladder logic control program instruction. As the general purpose processor section 60 and the second microprocessor 61 contained therein typically execute only one or two percent of the ladder logic control program instructions, they are relatively free to perform other tasks. A principal processing task performed by this section 60 is the interpretation of the function chart files that define the sequence in which a series of ladder logic control programs will be executed. The function chart and its interpretation are described in U.S. Pat. No. 4,742,443. In interpreting the function chart files the general purpose processor section 60 looks ahead and obtains data regarding the next ladder logic program or group of ladder logic programs to execute upon the termination of the one that currently is executing. This look-ahead capability provides an efficient, rapid transition between consecutive portions of the function chart.

Additional execution time of the general purpose processor section 60 can be assigned to record keeping tasks regarding the performance of the equipment controlled by the programmable controller 10. The results of such record keeping can be transmitted periodically to a host computer over network 17 using the first communication processor section 21.

One of the key features of the present processor module 20 is the ability of a remote device, such as a host computer, to directly access the data tables in the shared system RAM. Software tasks within the first and second communication sections 21 and 70 of the processor module 20 permit a device on networks 15 or 17 to read from and write into the data tables 41-43 without intervention of the user control program.

Figure 5:
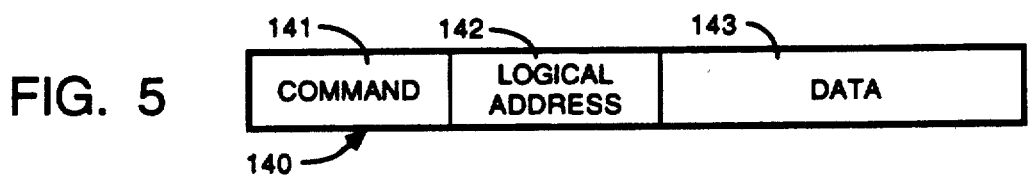
FIG. 5 is a depiction of a commend message frame which an external device uses to direct the operation of the programmable controller.
Figure 6:
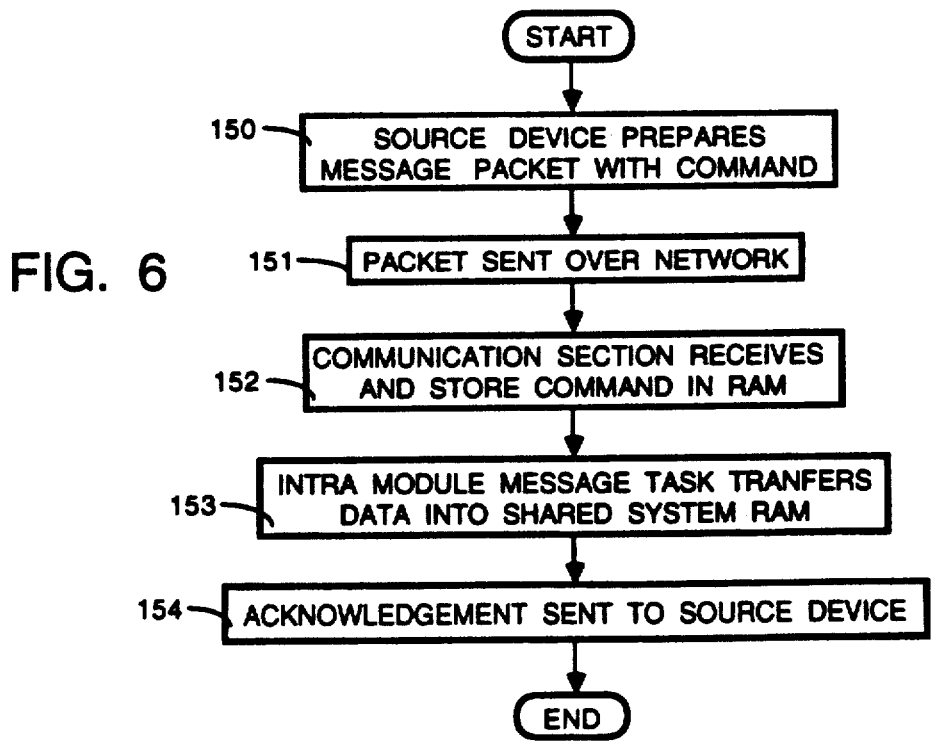
FIG. 6 is a flowchart of the process by which the programmable controller handles the command message frames.

The process by which data is stored in a data table is depicted by the flowchart of FIG. 6. Initially at step 150, a source device such as a host computer assembles the data to be written into a command message frame 140 as illustrated in FIG. 5. A first field 141 of the message frame contains a command to be executed by the message recipient. In this example, the command instructs the recipient to write the data into its storage location defined by a logical address in field 142 of the message frame. This address defines the location of the data table 41, 42 or 43 in which to place the message data. The data being conveyed is contained in field 143 of the message frame 140.

The source device places the command message frame into a message packet for transmission over LAN 17 to the programmable controller 10. The exact nature of the message packet depends upon the particular protocol defined for the exchange of messages over the LAN. Typically the message packet contains fields of data identifying the source and the destination stations on the LAN for the message. The assembled message packet then is sent over LAN 17 to the processor module 20 of programmable controller 10 at step 151.

With reference to FIG. 2, the message packet is received from the LAN 17 by the first network interface circuit 29 in the first communication processor 21. When the message packet begins to be received, the first network interface circuit 29 interrupts the first microprocessor 22. In response to being interrupted, the first microprocessor 22 commences executing a firmware routine stored in the first ROM 26. This routine handles the receipt of data and stores the incoming message packet in an area of the first RAM 27 designated for such messages at step 152. When the entire message packet has been received and stored, a flag is set within first RAM 27 to indicate the receipt of a command for the processor module 20.

The setting of this flag is detected by another firmware routine stored in the first ROM 26 which performs the task of executing the command specified in the received message. This second firmware routine in the example transfers the message data into the shared system RAM 36 in step 153. In doing so, the logical address is obtained from the command message and used to formulate the actual address of the storage location for the data. Since the location is within the shared system RAM 36 the first microprocessor 22 requests access to the shared buses 33-35 unless it already has such access. When the access is granted by the arbiter 134 in the ladder logic processor (see FIG. 4), the first microprocessor enables the two sets of gates 31 and 32 to couple the address and data buses in the first communication processor section 21 to the shared address and data buses 33 and 34 respectively.

The first microprocessor 22 then sends the address to the shared system RAM 36 along with control signals which place the memory in the write mode. The data for storage at this address is supplied by the first communication section 21 over the shared data bus 34 to the shared system RAM 36. If data for several storage locations was sent in the command message, the process of addressing the memory and writing the data is repeated until all the data has been stored.

Thereafter, the first microprocessor 22 formulates an acknowledgement of the command execution to be sent to the source device over LAN 17. The acknowledgement message contains an indication that the command was properly carried out or alternatively indicates the nature of any errors that occurred during command execution. If the command had been to read data at a given address, the data is returned to the source device with the acknowledgement. At step 154, the acknowledgement message is sent to the source device and the process terminates.

We claim:

1. In a programmable controller having input and output modules that interface electrical signals with sensing and actuating devices on machinery operated by the programmable controller, the input and output modules being connected to backplane buses; a processor module comprising:

a first memory means for storing data representing status of the sensing and actuating devices;

a second memory means for storing a control program defined by the user, which control program uses the data stored in said first memory means and which control program is written in a programming language consisting of a set of control program instructions;

a logic circuit means for executing a first subset of control program instructions;

a custom microcoded processor means for executing a second subset of control program instructions, which second subset is non-intersecting with the first subset;

a general purpose processor section including a microprocessor to execute a third subset of control program instructions which third subset is non-intersecting with the first and second subsets, a read only memory for storing a program which the microprocessor executes, and a group of address, data and control buses to which the microprocessor and the read only memory are connected;

a control program instruction decoder which responds to control program instructions read from said second memory means by enabling either said logic circuit, said custom microcoded processor or said general purpose processor section depending upon which one is able to execute each such instruction;

an interface circuit, coupled to the backplane buses, for controlling the exchange of data between said first memory means and the input and output modules; and a set of buses to which said memory means, said interface circuit, said logic circuit means, said custom microcoded processor means, said general purpose processor section, and said control program instruction decoder are connected to exchange signals.

2. The processor module as recited in claim 1 further comprising means for exchanging messages with a remote processing device coupled to the processor module by a communication link, and including means for transferring data from the remote processing device into the first memory means.

3. The processor module as recited in claim 1 wherein said custom microcoded processor means includes:

an instruction memory that stores microcode instructions for operations defined by the second subset of control program instructions;

an instruction sequencer, coupled to said instruction memory, for reading microcode instructions from said instruction memory in response to instructions in the second subset of control program instructions;

an arithmetic logic unit which executes the microcode instructions read from said instruction memory; and means for electrically interconnecting said instruction memory, said instruction sequencer and said arithmetic logic unit to exchange signals controlling the operation of the custom microcoded processor.

4. The processor module as recited in claim 1 wherein said logic circuit means, said custom microcoded processor means and said general purpose processor section each includes means for requesting access to said first and second memory means; and further comprising means for arbitrating among different requests for access to said first and second memory means.

5. The processor module as recited in claim 1 wherein said general purpose processor section further includes a math co-processor connected to said group of address, data and control buses.

6. The processor module as recited in claim 1 wherein said general purpose processor section further includes transmission gates coupling the address bus and data bus in the group to said set of buses.

* * * * *